(12) United States Patent
Raffa et al.

(10) Patent No.: US 12,143,917 B2
(45) Date of Patent: Nov. 12, 2024

(54) ROLE-BASED ACCESS CONTROL SYSTEM

(71) Applicant: Salesforce, Inc., San Francisco, CA (US)

(72) Inventors: Carmen Raffa, San Francisco, CA (US); Aish Raj Dahal, San Francisco, CA (US); Jose Medina, San Francisco, CA (US); Robin McConnell Balaga, San Francisco, CA (US); Jennifer Enrique, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/239,308

(22) Filed: Aug. 29, 2023

(65) Prior Publication Data
US 2023/0403630 A1 Dec. 14, 2023

Related U.S. Application Data

(63) Continuation of application No. 17/733,269, filed on Apr. 29, 2022, now Pat. No. 11,778,539, which is a
(Continued)

(51) Int. Cl.
*H04W 48/04* (2009.01)
*H04L 12/18* (2006.01)
*H04L 65/403* (2022.01)
*H04M 3/56* (2006.01)
*H04W 4/08* (2009.01)

(52) U.S. Cl.
CPC ......... *H04W 48/04* (2013.01); *H04L 12/1822* (2013.01); *H04L 65/403* (2013.01); *H04M 3/566* (2013.01); *H04W 4/08* (2013.01)

(58) Field of Classification Search
CPC .... H04W 48/04; H04W 4/08; H04L 12/1822; H04L 65/403; H04M 3/566
See application file for complete search history.

(56) References Cited

U.S. PATENT DOCUMENTS 10,666,657 B1 * 5/2020 Threlkeld ............. H04L 9/0643
10,867,269 B2 12/2020 Grady Smith et al.
(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
(Continued)

*Primary Examiner* — Duc C Ho
(74) *Attorney, Agent, or Firm* — Lee & Hayes, P.C.

(57) ABSTRACT

A computer-readable media, system, and method for providing role-based access management to channels within a group-based communication system. Role-based access management allows for a plurality of roles to be established and for users to be associated with these roles. Roles may be associated with sets of permissions allowing users assigned to the respective role to perform various actions within the group-based communication system. The group-based communication system may include preset, system roles with predetermined permissions and custom, user-defined roles may be created by administrators within the group-based communication system.

20 Claims, 5 Drawing Sheets

Related U.S. Application Data continuation of application No. 17/038,338, filed on Sep. 30, 2020, now Pat. No. 11,343,753.

(56) References Cited

U.S. PATENT DOCUMENTS

| | | | |
|---|---|---|---|
| 2014/0187280 | A1 | 7/2014 | Bekiares et al. |
| 2016/0188887 | A1 | 6/2016 | Ghafourifar et al. |
| 2016/0277235 | A1* | 9/2016 | Bhesania ............ H04L 41/0803 |
| 2017/0277775 | A1 | 9/2017 | Eigner et al. |
| 2017/0295181 | A1 | 10/2017 | Parimi et al. |
| 2018/0287982 | A1 | 10/2018 | Draeger et al. |
| 2019/0026486 | A1* | 1/2019 | Pleau .................... H04L 63/104 |
| 2019/0058682 | A1 | 2/2019 | MacAskill et al. |
| 2019/0205317 | A1 | 7/2019 | Tobias et al. |
| 2019/0334956 | A1 | 10/2019 | Hodgins et al. |
| 2020/0348829 | A1* | 11/2020 | Fay ........................ G06N 20/00 |
| 2021/0144517 | A1 | 5/2021 | Guim Bernat et al. |
| 2022/0104105 | A1 | 3/2022 | Raffa et al. |
| 2022/0256438 | A1 | 8/2022 | Raffa et al. |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", FUJITSU Sci. Tech. J., 36, 2, (Dec. 2000) pp. 154-161.
Office Action for U.S. Appl. No. 17/733,269, mailed on Dec. 30, 2022, Carmen Raffa, "Role-Based Access Control System," 5 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

ROLE-BASED ACCESS CONTROL SYSTEM

RELATED APPLICATIONS

This patent application is a continuation application claiming priority benefit, with regard to all common subject matter of U.S. patent application Ser. No. 17/733,269, filed Apr. 29, 2022, now U.S. Pat. No. 11,778,539, issued Oct. 3, 2023, and entitled "ROLE-BASED ACCESS CONTROL SYSTEM" ("the '269 Application") which is a continuation application of U.S. patent application Ser. No. 17/038,338, filed Sep. 30, 2020, now U.S. Pat. No. 11,343,753, issued May 24, 2022, and entitled "ROLE-BASED ACCESS CONTROL SYSTEM" ("the '338 Application"). The identified earlier-filed application is hereby incorporated by reference in its entirety into the present application.

TECHNICAL FIELD

Embodiments of the invention relate to role-based access control. More specifically, embodiments of the invention relate to role-based access control within a group-based communication system.

Traditionally, access control methods within group-based communication systems are limited to a few standard account types. For example, a typical access control method may consist of only two account types, administrator accounts and standard user accounts with access control being delegated rigidly between either type of account. Accordingly, each account type is associated with a static list of permissions. This approach is limited in terms of customization, where a large number of roles having customizable permissions is preferred. At the same time, manually assigning and managing permissions on a per-user basis rapidly becomes infeasible for large-scale organizations. As such, what is needed is a role-based access control system comprising a plurality of roles with customizable permissions.

SUMMARY

Embodiments of the invention solve the above-mentioned problems by providing a system and method for role-based access management within a group-based communication system where roles are associated with customizable permissions allowing allocation of permissions between users.

A first embodiment of the invention is directed to one or more non-transitory computer-readable media storing computer-executable instructions that, when executed by a processor, perform a method for role-based access management to a channel within a group-based communication system, the method comprising receiving a request, from a user of the group-based communication system, to perform an action within the group-based communication system, determining a permission requirement associated with the action in the group-based communication system, determining a group-based communication system role associated with the user based on a group-based communication system identifier for the user, determining whether the group-based communication system role satisfies the permission requirement based on at least one permission associated with the group-based communication system role, if it is determined that the group-based communication system role satisfies the permission requirement, performing the action within the group-based communication system, and if it is determined that the group-based communication system role does not meet the permission requirement, denying the request to perform the action.

A second embodiment of the invention is directed to a system for providing role-based access management to a channel within a group-based communication system, the system comprising a data store, and a processor programmed to perform a method for providing role-based access management to a channel within a group-based communication system, the method comprising receiving a request, from a user of the group-based communication system, to perform an action within the group-based communication system, determining a permission requirement associated with the action in the group-based communication system, determining a group-based communication system role associated with the user based on a group-based communication system identifier for the user, determining whether the group-based communication system role satisfies the permission requirement based on at least one permission associated with the group-based communication system role, if it is determined that the group-based communication system role satisfies the permission requirement, performing the action within the group-based communication system, and if it is determined that the group-based communication system role does not meet the permission requirement, denying the request to perform the action.

A third embodiment of the invention is directed to a method for role-based access management to a channel within a group-based communication system, the method comprising receiving a request, from a user of the group-based communication system, to perform an action within the group-based communication system, determining a permission requirement associated with the action in the group-based communication system, determining a group-based communication system role associated with the user based on a group-based communication system identifier for the user, determining whether the group-based communication system role satisfies the permission requirement based on at least one permission associated with the group-based communication system role, if it is determined that the group-based communication system role satisfies the permission requirement, performing the action within the group-based communication system, and if it is determined that the group-based communication system role does not meet the permission requirement, denying the request to perform the action.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
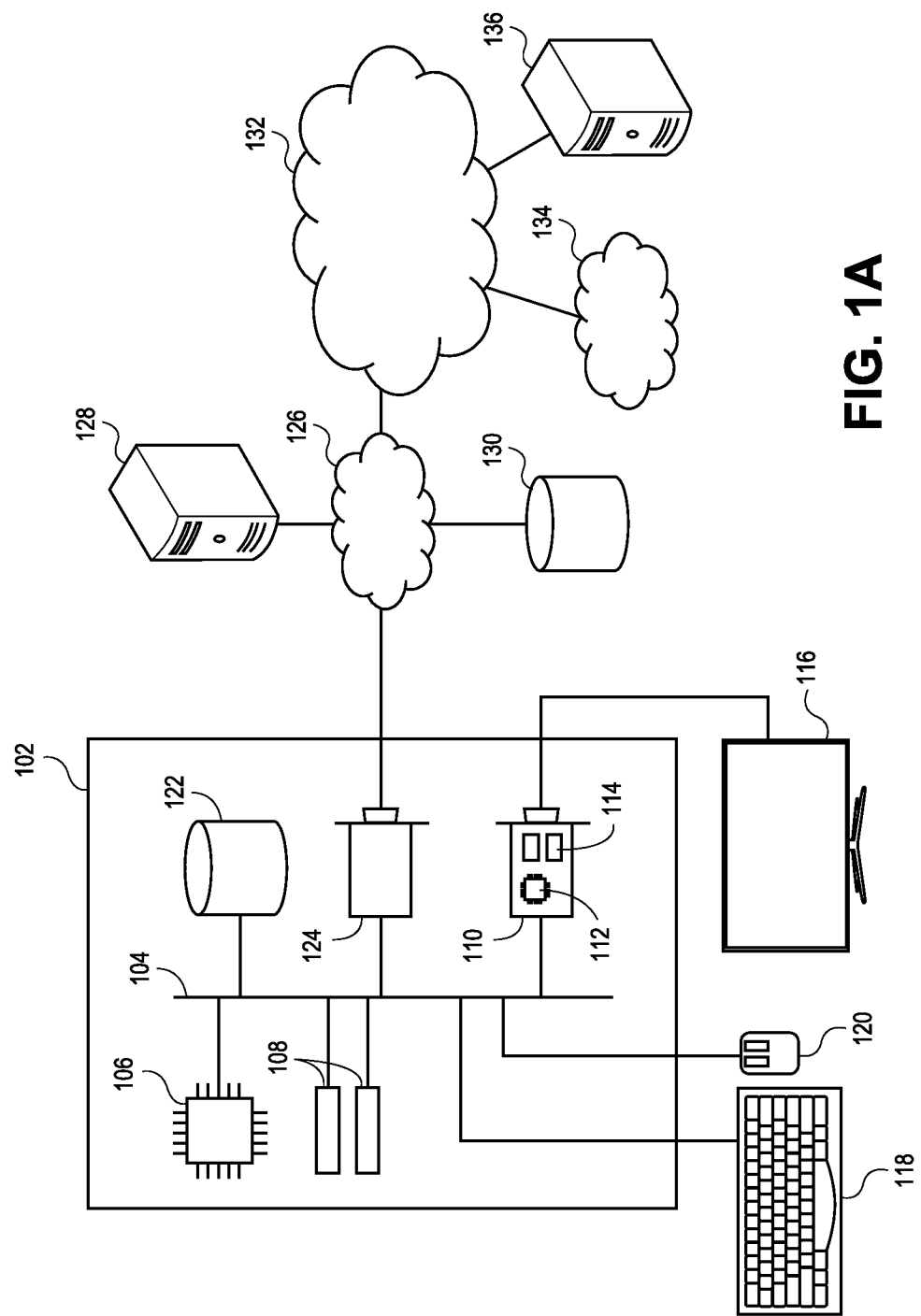
FIG. 1A depicts an exemplary hardware platform for some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

At a high level, embodiments of the invention provide a system and method for role-based access management within a group-based communication system where roles are associated with customizable permissions allowing allocation of permissions between users. By assigning users to roles and configuring permissions associated with the roles access is managed effectively. Accordingly, access can be delegated dynamically to meet changing needs of a specific organization.

Turning first to FIG. 1A, an exemplary hardware platform for some embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
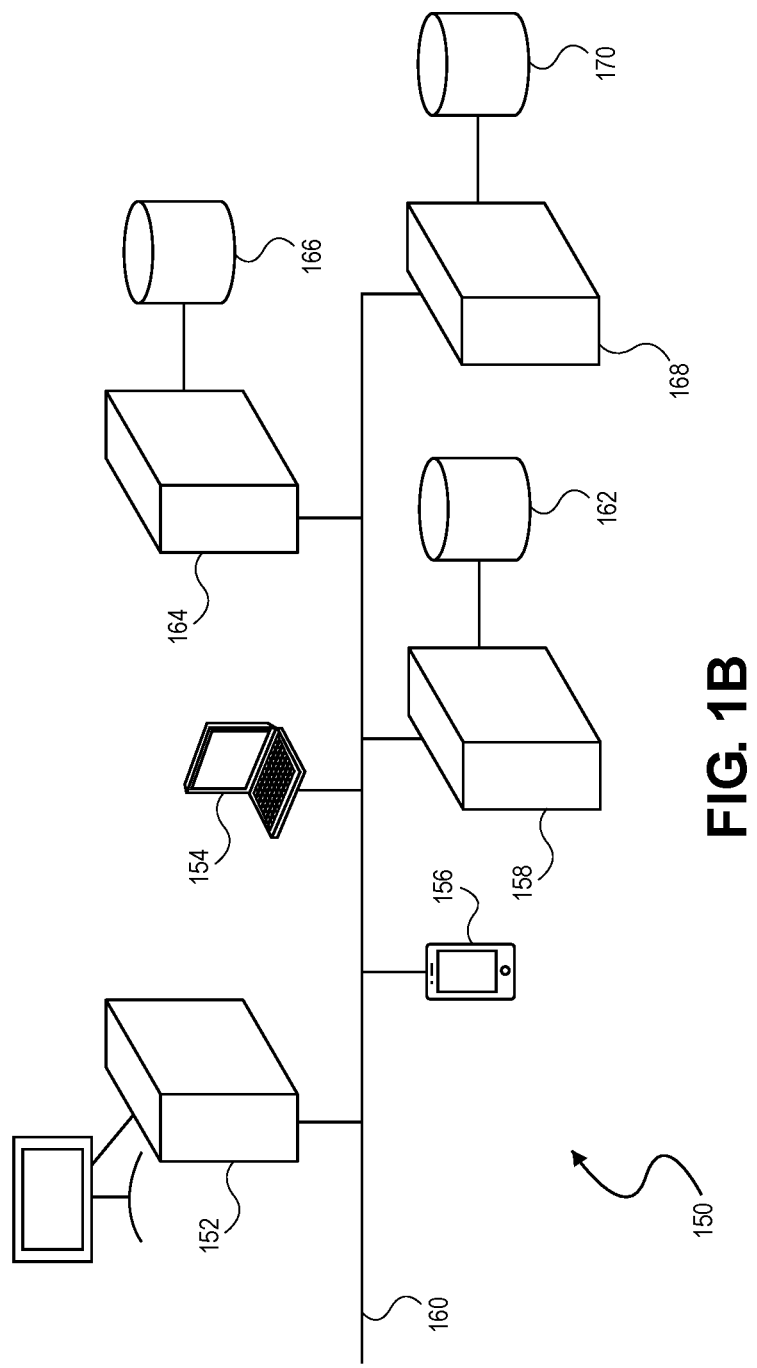
FIG. 1B depicts an exemplary diagram illustrating components of a system for carrying out embodiments of the invention.

Turning now to FIG. 1B, an exemplary network system 150 for carrying out embodiments of the invention is depicted. The network system 150 comprises any number of client devices, such as client device 152, client device 154, and client device 156. As depicted in FIG. 1B, client devices 152, 154, and 156 may be any of a desktop computer, a laptop computer, a mobile phone, a tablet, or any other device suitable to allow a user to access the group-based communication system. The user may also switch from one client device to another, and may access the group-based communication system via multiple devices simultaneously. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some examples, the group-based communication system is a channel-based messaging platform having a plurality of messaging channels available to a respective portion of the users of the group-based communication system.

The system further comprises a group-based communication system server 158 that acts as a host for the group-based communication system. The group-based communication system server 158 may be a dedicated server, a shared server, or any other form of computing device discussed above with respect to FIG. 1A. Although a single group-based communication system server 158 is depicted, embodiments with multiple group-based communication system servers are also contemplated so as to provide scale, redundancy and/or isolation between different instances of the group-based communication system. For example, a particular organization that uses the group-based communication system may not wish to have its group-based communications system hosted on the same server as a competitor's group-based communication system for security reasons. Group-based communication server 158 is communicatively coupled to client devices 152, 154, and 156 via network 160. Network 160 may be a local area network (LAN), wide-area network (WAN), virtual private network (VPN) or the Internet. Broadly speaking, any type of network for providing communication between the various components of system is contemplated. Group-based communication system server 158 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client applications are also contemplated.

It should be understood that the group-based communication system as referred to herein may provide a communication platform for a plurality of users. Wherein each user may be associated with a specific organization. An organization may be a small business, a corporation, a club, a shared-interest group, or any other group of users desiring to mutually communicate. The group-based communication system is operable to provide communication services to any combination of users. For example, in some embodiments, communication services can be provided for a plurality of users from a single organization, as well as a plurality of users from a plurality of organizations. In some embodiments, a plurality of channels are present within the group-based communication system. Users may be added to each channel, such that users within the channel have access to messages and files displayed within the channel. Further, users within the channel have the ability to post messages and upload files within the channel. In some embodiments, users may be added to a particular channel by an administrator, such as an administrator within a particular organization. Alternatively, in some embodiments, users may be added by any user within the channel. Further, in some embodiments, channel parameters such as who can add users may be set by the channel creator. For example, channels created by a particular organization may follow that organization's security policy, in which only administrators can add users to certain channels.

Group-based communication system data store 162 is communicatively connected to group-based communication system server 158. As depicted, group-based communication system data store 162 is directly connected to group-based communication system server 158; however, any form of communicative connection (for example, network-attached storage (NAS), a network file system (NFS), or cloud-based storage) can be employed. Broadly speaking, group-based communication system data store 162 stores all of the information used by group-based communication system server 158. For example, group-based communication system data store 162 may store all of the messages with their associated channels, documents and images uploaded to particular channels, channel membership information, and/or user information. As previously discussed, multiple group-based communication system servers may be present in system 150. In such embodiments, each group-based communication system server may have its own copy of group-based communication system data store 162. Alternatively, multiple group-based communication system servers may share a single network-attached group-based communication system data store 162. Alternatively or in addition, in any of these embodiments, data may be sharded across multiple group-based communication system data stores.

Also communicatively coupled to group-based communication system server 158 is identity provider server 164. The identity provider server manages user identities and user groups in some embodiment of the invention. For example, a user group may be assigned a role, thereby granting all members of that group the associated permissions as long as they belong to that group. As depicted, client devices 152, 154, and 156, group-based communication system server 158 and identity provider server 164 are all attached to the same network. However, embodiments where this is not the case are also contemplated. For example, client 152 and group-based communication system server 158 may be attached to the same LAN, while client 154 is attached via a VPN and clients 156 and identity provider server 164 are connected via the Internet. Broadly, any combination of forms of communicative coupling is contemplated. In some embodiments, identity provider server 164 may be the same physical server as group-based communication system server 158.

Communicatively coupled to identity provider server 164 is identity provider data store 166. Identity provider data store 166 stores identity data used for access control within the group-based communication system. Identity provider data store 166 may additionally store other data used in providing identity services, including user identity data, user authentication data, user group data, user permission data and user contact data. As with group-based communication system data store 162, identity provider data store 166 may be directly connected to identity provider server 164 or may be connected via any form of network and may be replicated and/or sharded across the network for performance and/or reliability.

In some embodiments, network system 150 further comprises a role server 168 for managing role information, such as user group information, custom role information, preset role information, role permissions, and context-specific role information. Role server 168 is communicatively coupled to a role data store 170. Role data store 170 stores role information such as the above-mentioned user group information, custom role information, preset role information, role permissions, and context-specific role information. In some embodiments, the role data store 170 stores a plurality of roles, wherein each role is associated with a list of users assigned to the role and a set of permissions associated with the role. As with group-based communication system data store 162, role data store 170 may be directly connected to role server 164 or may be connected via any form of network and may be replicated and/or sharded across the network for performance and/or reliability. In some embodiments, role server 164 may be the same physical server as group-based communication system server 158. Similarly, one or more of the identity provider data store 166 and the role data store 170 may be the same physical data store as group-based communication system data store 162.

It should be understood that, in some embodiments, it may be desirable to combine the functionality of some of the components of the network system. For example, embodiments are contemplated where the group-based communication system server 162 carries out at least a portion of the functionality described with respect to identity provider server 164 and role server 168. Here, the identity provider server 164 and role server 168 may not be needed. In such embodiments, it may be desirable that the contents of any of identity provider data store 166 and role data store 170 be stored within the group-based communication system data store 162. Here, instead of being separate components, the identity provider data store 166 and the role data store 170 are included as part of the group-based communication system data store 162. Alternatively, in some embodiments, the group-based communication system server 158 may be communicatively coupled to either of the identity provider data store 166 and the role data store 170.

It should be understood that any of the client devices 152, 154, and 156, and the group-based communication system server 158 may comprise a processor, such as CPU 106 described with respect to FIG. 1A. Any of the functions described herein with respect to a processor may be carried out by the processors within any of these devices. In some embodiments, for example, a processor within the group-based communication system server 158 may perform a first function, while a processor within the client device 156 performs a second function.

Figure 2:
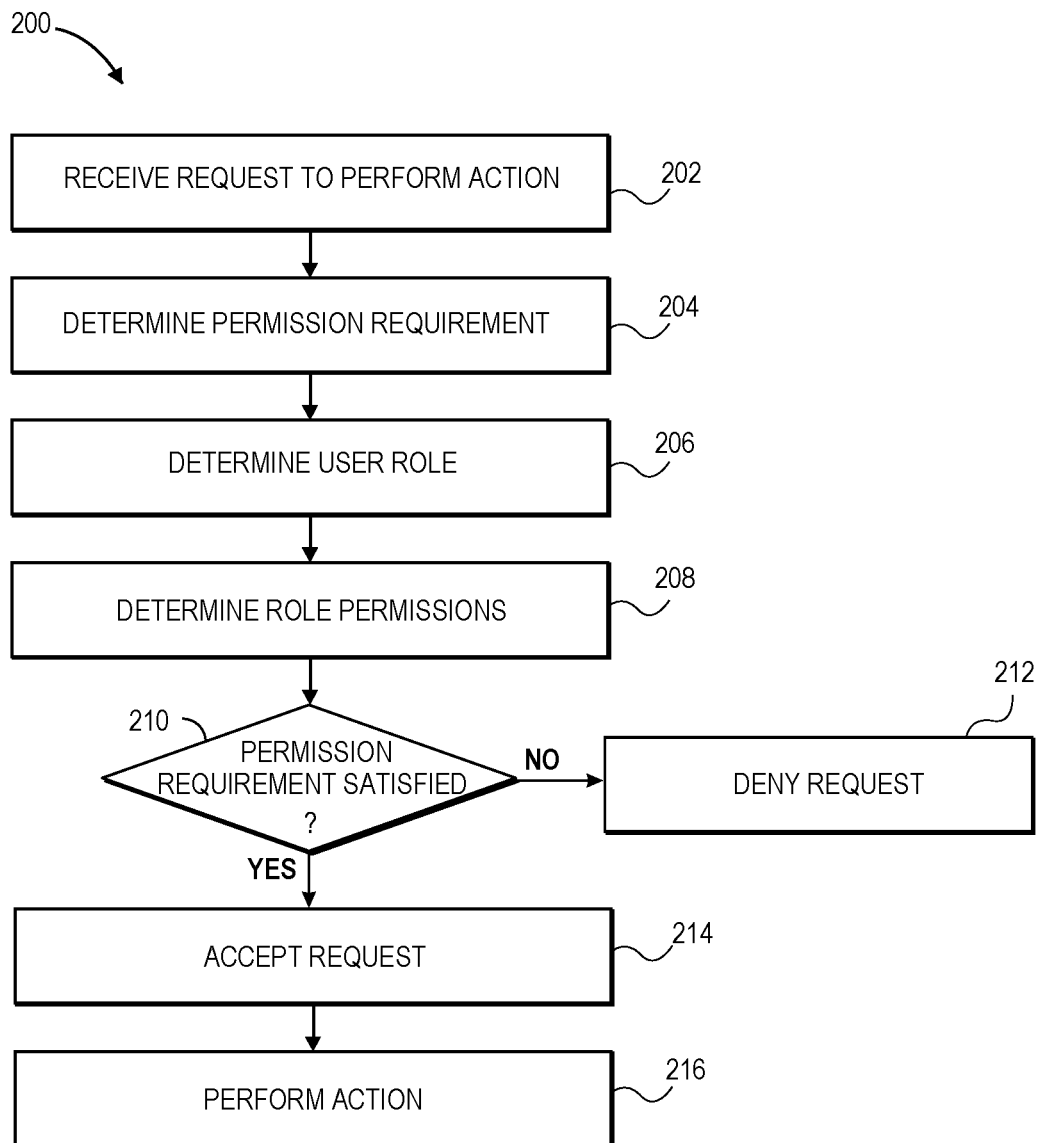
FIG. 2 depicts a method for performing role-based access management for some embodiments of the invention.

Turning now to FIG. 2, a method for performing role-based access management for some embodiments is depicted and referred to herein generally by reference numeral 200. Beginning at step 202, a request to perform an action is received. The request may be received from a user via one of the client devices 152, 154, or 156. For example, the request may to create a new channel shared between a first organization and a second organization within the group-based communication system. It should be understood that, in some embodiments, other actions may be associated with the request and that a request may be received for virtually any action attempted within the group-based communication system. For example, the action may be any of attempting to access content, sending a message, reading a message, sharing a file, creating a channel, editing a channel, adding a user, removing a user, adding a role, editing a role, assigning a role, editing permissions, and managing emojis. It should be understood that other actions within the group-based communication system are contemplated and that the invention is not limited to the actions listed herein.

Next, at step 204, a permission requirement associated with the action is determined. Each action in the group-based communication system may have an associated permission, or sets of actions may be grouped together into a single permission. For some actions, no permission may be required. At step 206, a role associated with the user is determined based on an identifier for the user. In some embodiments, the role is a group-based communication system role associated with the group-based communication system. For example, the group-based communication system role may be any one of a preset, system role or a user-defined, custom role. Similarly, the identifier for the user may be a group-based communication system identifier to identify the user within the group-based communication system, such as, for example, a user account number, a user identification number, or another means of user identification. In other embodiments, the identifier is associated with the identity provider server 164, and is mapped to a user identifier (such as a username or handle) in the group-based communication system.

At step 208, at least one role permission associated with the role is determined. In some embodiments, the role may be associated with a set of permissions. In such embodiments, the set of permissions is identified for the role. At test 210, it is determined whether at least one permission identified at step 208 satisfies the permission requirement at step 204. Test 210 will succeed if the role contains the necessary permissions to perform the action at step 202. In some embodiments, where a set of permissions is identified, satisfaction of the permission requirement may be analyzed for each permission within the set of permissions. Accordingly, if at least one of the permissions of the set satisfies the permission requirement the permission requirement will be considered to be satisfied. If the permission requirement is not satisfied, the method moves to step 212, where the request is denied. In this case, the action is not performed within the group-based communication system. Upon denying the request a notification may be sent to the user via one of the client devices to notify the user that the action cannot be performed because the user is not associated with any roles that have permission to perform the action.

At step 214, if it is determined that the permission requirement is satisfied, the request is accepted. Upon accepting the request, the action is performed within the group-based communication system at step 216. For example, if the action was an attempt to create a channel between the first organization and the second organization within the group-based communication system, as described above, the channel will be created after it is determined that the user is associated with a role that has permission to create channels between multiple organizations and thus, meets the permission requirement.

An exemplary operation of the method 200 will now be described in detail. In this example operation, a first user of a first organization is assigned to an emoji manager role within the group-based communication system. The emoji manager role is associated with a set of permissions relating to managing emojis, reactions, or emoticons within the group-based communication system. The permissions may be associated with specific emoji management operations, such as reviewing emoji requests, approving emoji requests, denying emoji requests, adding emojis, removing emojis, and disabling emojis. For the sake of this example, the emoji manager role is a user-defined custom role that has previously been configured by an administrator of the first organization. Accordingly, the active context of the role for this example is limited to the first organization and to channels belonging to the first organization. It should be understood that different roles may be assigned for different contexts. For example, in some embodiments, a role may be limited to the context of a single channel or the entire group-based communication system.

At step 202, a request is received from the first user to add an emoji to a list of accepted emojis for use by users of the first organization. For example, the ability to add emojis that can be used by users of the group-based communication system may be limited to prevent employees from adding inappropriate emojis. At step 204, a permission requirement is determined. Here, the permission requirement is associated with permission to add emojis within the context of channels within the first organization. At step 206, a user role is determined. It should be understood, that in some embodiments, a single user may be associated with a plurality of roles. For example, the first user may be associated with both the emoji manager role and a standard user role. Thus, each role that the user is associated with may be determined. Accordingly, at step 208 where the role permissions are determined, the permissions for both roles that the user is associated with are determined. In some embodiments, a list of all permissions associated with the user is returned, without regard to which role granted the particular role to the particular user. Here, the permissions to add emojis is included in the list for the emoji-managing because the first user belongs to emoji-manager role.

At step 210, the permission requirement is satisfied because the first user belongs to the emoji manager role which has permission to add emojis. Thus, the method moves on to step 214 where the request to add the emoji is accepted and step 216 where the emoji is added to the list of accepted emojis for use within the group-based communication system by users of the first organization. Alternatively, if a second user who was not assigned to the emoji manager role attempted to add an emoji the request would be denied and the emoji would not be added to the list of accepted emojis. It should be understood that the emoji manager example above is a single example of the operation of method 200 and that many other roles, actions, and permissions may be present and are within the scope of the invention.

Figure 3:
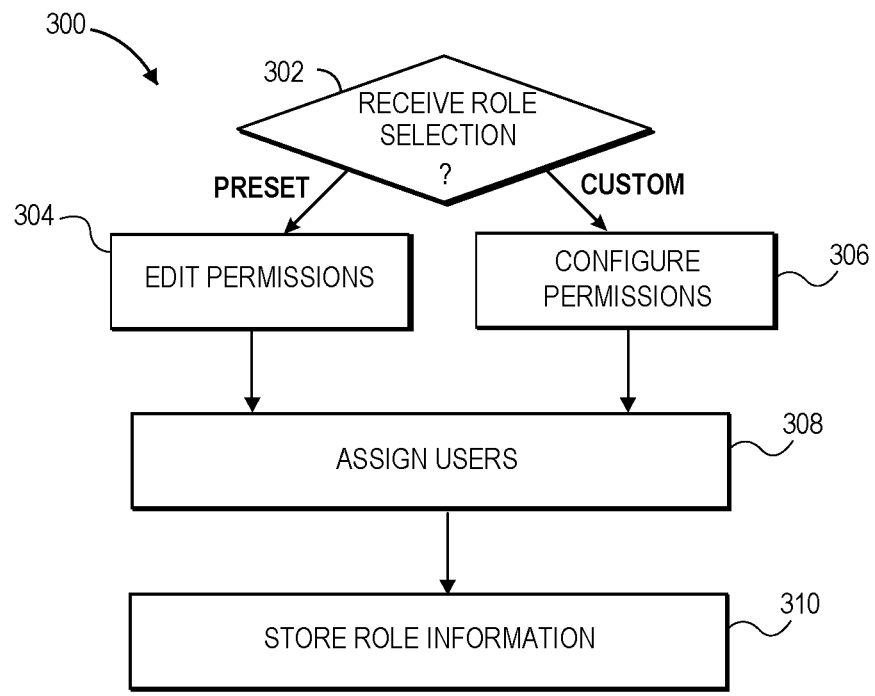
FIG. 3 depicts a method for assigning roles within a group-based communication system for some embodiments of the invention.

Turning now to FIG. 3, a method for assigning roles within the group-based communication system for some embodiments is depicted and referred to generally herein by reference numeral 300. At step 302, a selection is received from a user to assign either of a preset, system role, or a custom, user-defined role. If the user selects the preset, system role the method moves on to step 304 where the user can optionally edit the permissions associated with the selected preset, system role. Preset, system role as used herein may refer to a role that is preset within the group-based communication system and is not created or defined by a specific user. For example, preset, system roles may include default roles such as an administrator role and a standard user role. Each of the preset, system roles may be associated with a set of default permissions, which in some embodiments may be edited or assigned at step 304. The set of default permissions may be a predetermined list of permissions defined by the group-based communication system. Alternatively, it should be understood that, in some embodiments, the system roles may be static where permissions for the system roles cannot be edited or new permissions assigned. For example, in an embodiment, a default administrator role may be associated with a set of default permissions including permission to create channels, add users, remove users, edit roles, create custom roles, and edit encryption settings. Similarly, a default standard user role may be associated with more limited permissions including permission to send messages and view messages.

If a custom role is selected by a user at step 302, the method moves to step 306 where permissions are configured for the custom role. Here, various attributes of the custom role may be established by the user, such as the role name, the context of the role, and other attributes. If the custom role is a newly created custom role, the permissions are configured for the role and may be selected from a list of permissions allowing various actions within the group-based communication system. Alternatively or in addition, permissions may be explicitly created and associated with the role. As another alternative or additional option, if the selected custom role is an existing custom role that has already been established in the group-based communication system, the user may edit the permissions associated with the custom role by removing permissions or adding new permissions. In some embodiments, a custom role is associated with a list of custom user-defined permissions.

It should be understood that, in some embodiments, a context may be associated with a role of either type (a preset role or a custom role). In such embodiments, the context of the role may determine for what context within the group-based communication system the role is active. For example, contexts may be associated with a specific channel within the group-based communication system, such that roles in this context only apply to actions taken within the specific channel. For example, a user may have the administrator role for a particular channel, but be a normal user with no special role (or permissions) in other channels. Alternatively, a role may be associated with the context of an entire organization, such that the role applies to any action taken within the organization, or within a channel owned by the organization. In some embodiments, the context of a role may be associated with a plurality of channels or workspaces within the group-based communication system. Further, in some embodiments, a single role may be associated with multiple contexts with varying permissions between contexts. For example, a user may belong to a user role that has permission to send messages in channels owned by the user's organization but does not have permission to send messages in other channels. Accordingly, the overall number of roles that need to be created is reduced. For this reason, it may be desirable that varying permissions can be configured for each context for a particular role.

At step 308 at least one user is selected to assign said at least one user to the role. In some embodiments, a user group associated with a plurality of users may be selected and each user of the plurality of users is assigned to the role. For example, an existing group of users in group-based communications system or an identity provider group may be assigned to a role. In some embodiments, additional users may be added to a role after some users are already assigned to the role. It should be understood that a similar method may be performed to remove users from an assigned role or unassign a role to a user. Accordingly, a user may be selected to remove said user from a role.

After role permissions have been configured or edited and users are assigned, role information is stored at step 310. The role information may comprise any of user information, role information such as role name and role context, role permissions, or other information related to roles, permissions, or users. In some embodiments, the role information is stored in the role data store 170. Alternatively, the role information may be stored in the group-based communication system data store 162 or the identity provider data store 166. It should be understood that a variety of storage methods may be used to store the role information. For example, in some embodiments, role information may be sharded across multiple storage locations. In some embodiments, the role information may organized into a list with a set of role permissions stored along with each respective roles. In some such embodiments, a list of assigned users may also be stored along with the roles. Alternatively, in some embodiments, user information is stored elsewhere along with at least one role identifier used to identify the roles that a respective user is associated with. For example, in some embodiments, a role identifier is saved as a user attribute associated with the user. Here, the role identifier is used to associate the user with a respective role. In some embodiments, a combination of the storage methods described herein may be used as well as other known data storage methods.

Continuing the example from above, the first user is assigned to an administrative, role-manager role in addition to the emoji-manager role. The role-manager role has a set of permissions relating to managing and assigning roles including creating roles, editing roles, editing role permissions, editing role contexts, assigning users, and unassigning users. Accordingly, the first user, using one of client devices 152, 154, or 156, accesses the group-based communication system and attempts to create a role. Because the first user is assigned to the role-manager role, the first user is granted access to create and manage roles. The first user selects custom role at step 302. In some embodiments, the selection options for a preset role and a custom role may be presented to the user via a graphical user interface on a display of the user's device.

After the selection for a custom role is received at step 302, the graphical user interface presents the user with an option to edit permissions of an existing custom role or to create a new custom role. For the sake of this example, the first user wishes to create a new custom calendar-manager role. Thus, the first user selects the option to create a new custom role. At step 304, the first user is presented by the graphical user interface with options to configure permissions of the new role, as well as to input information relating to the role (such as, for example, the role name and a context of for role). Here, the first user may type the name "calendar manager" for the role and set the context to a specific scheduling channel belonging to the first organization. The first user then specifies parameters for the calendar manager role, such as accessing certain content within the scheduling channel, editing a calendar associated with the scheduling channel, and adding users.

After configuring permissions for the calendar manager role at step 304, the first user is presented by the graphical user interface with the option to select users to be assigned to the calendar manager role at step 306. Here, the first user may select a second user and a third user to be assigned to the calendar manager role. Accordingly, the second and third user will have access to the permissions defined at step 304 and will be able to access content on the scheduling channel, edit the calendar, and add users to the scheduling channel. It should be understood that, in this example, these permissions are limited to actions within the scheduling channel because this is the context which the first user specified for these permissions. In other embodiments, roles may be created without a context and each user assigned a context for the role when they are added to the role. At step 308, the role information (including the role name, role context, permission context, role permissions, and user information relating to the users assigned to the role) is stored. In some embodiments, all of this data may be stored together on one of the group-based communication system data store 162, the identity provider data store 166, or the role data store 170. Alternatively, portions of the role information may be distributed and stored across different locations.

In some embodiments, additional functionality may be associated with roles, such as encryption policy. For example, in some embodiments, the encryption of contents within the group-based communication system may be determined based on a role of a user. In such embodiments, content shared by users having a first role may be encrypted while contents shared by users having a different role may not be encrypted or may be encrypted using a different encryption key. Another example of functionality differing based on roles may be related to authentication. In such embodiments, authentication policy may be determined based on a role of a user. For example, a user assigned to a first role may be required to perform two-factor authentication in order to access content in the group-based communication system, while another user assigned to a second role may not be required to perform authentication or may be authenticated using a different form of authentication. In some embodiments, a security role may be present with permissions related to security operations, such as data encryption. Accordingly, a user assigned to the security role may have permissions to edit security settings, rotate encryption keys, and adjust encryption policies.

It should be understood that many different roles are contemplated within the group-based communication system, such as a channel-owner role, a guest-manager role, and a multiple-organization channel-manager role. The channel-owner role may be associated with permissions to manage a particular channel. Accordingly, a user assigned to the channel-owner role may have permission to add and remove users from the channel, hide messages within the channel, edit channel settings such as the channel name, and other channel-specific operations. The guest-manager role may be associated with permissions related to managing guest users, such as, for example, adding guests to a channel or workspace, removing guests from a channel or workspace, and configuring guest settings. The multiple-organization channel-manager role may be associated with permissions relating to managing channels that are shared between multiple organizations. For example, a user assigned to the multiple-organization channel-manager role may have permission to create a channel shared between a first organization and a second organization, share an existing channel with another organization, and configure settings for a multiple-organization channel.

Further, in some embodiments, a role may be created for each external organization that a first organization interacts with. For example, if the first organization has a business relationship with an accounting organization, the first organization may assign a particular user to an accounting-organization-manager role. Here, the accounting-organization-manager role grants the user permission to manage interactions between the first organization and the accounting organization. Additionally, in some embodiments, a role may be present that is associated with permissions to manage and create roles. For example, a user may be assigned to a role-manager role with permission to create roles, edit role permissions, assign roles, and unassign roles. In some embodiments, role management permissions such as creating roles and editing role permissions may be associated with administrators.

Figure 4:
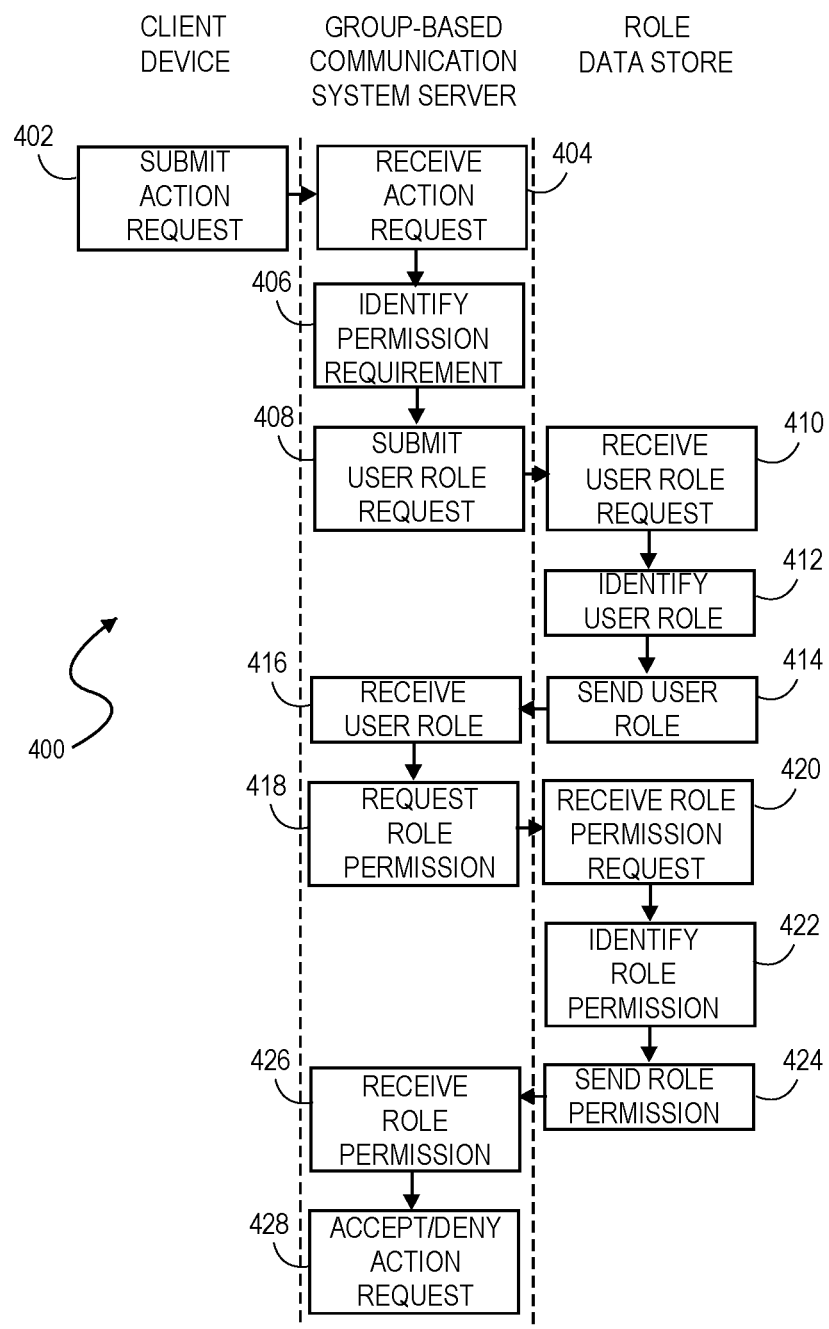
FIG. 4 depicts a swim lane diagram illustrating the component responsibility flow of a process for providing role-based access management for some embodiments of the invention.

Turning now to FIG. 4, a swim lane diagram is depicted illustrating the component responsibility flow of a process for providing role-based access control within the group-based communication system for some embodiments and generally referred to by reference numeral 400. Beginning at step 402, an action request is submitted by the client device. The action request may be an attempt by a user to perform an action in the group-based communication system, such as sending a message, reacting to a message, creating a channel, or any other action requiring permissions. In some embodiments, the user attempts to perform the action via an input to one of client devices 152, 154, and 156 by pressing a button, or typing on a keyboard. However, in some embodiments, other known input methods may be used. At step 404, the action request is received by the group-based communication system server 158.

After receiving the action request, the group-based communication system server 158 identifies a permission requirement associated with the action request at step 406. In some embodiments, the group-based communication system server may consult one of the group-based communication system data store 162, the identity provider data store 166, or the role data store 170 to identify the permission requirement. After the permission requirement is identified, the group-based communication system server 158 submits a user role request to the role data store 170 at step 408. In some embodiments, the user role request contains a unique user identifier to identify the user. The unique identifier may be a group-based communication system identifier to identify a respective user of the group-based communication system. In such embodiments, each user of the group-based communication system has a unique group-based communication system identifier.

The role data store 170 receives the user role request at step 410 and identifies at least one user role associated with the user based on a user identifier at step 412. After identifying the user role the role data store 170 sends the user role to the group-based communication system server 158 at step 414. In some embodiments, a single user may be assigned a plurality of roles. In such embodiments, multiple roles may be identified for a particular user and sent to the group-based communication system server 158.

At step 416 the group-based communication system server 158 receives the identified role associated with the user. At step 418 the group-based communication system server 158 requests at least one role permission associated with the user role from the role data store 170. The role data store 170 receives the role permission request at step 420 and identifies at least one role permission associated with the role at step 422. In some embodiments, the role data store 170 may query all permissions associated with the role or a plurality of roles identified for the user. Alternatively, in some embodiments, the role data store 170 may query a specific role permission associated with the action request. For example, if the action request is a request by a user to create a channel within the group-based communication system, the role based data store may refine the role permission search to specific permissions associated with creating channels. In such embodiments, the group-based communication system server 158 may instruct the role data store 170 to perform the search and may share information related to the action request.

After the at least one role permission is identified, the role data store 170 sends the role permission to the group-based communication system server 158 at step 424. It should be understood that, in some embodiments, the role permission may be identified and sent to the group-based communication system server 158 along with the user role at step 414. In such embodiments, overall processing may be reduced. Thus, it may be desirable for the role data store 170 to return the role permissions associated with the user role once the user role has been identified. Similarly, the role data store 170 may send a plurality of role permissions associated with each role that the user is assigned.

At step 426, the role permission is received by the group-based communication system server 158. The group-based communication system server 158 determines whether the received role permission satisfies the permission requirement identified at step 406 and either accepts or denies the action request at step 428 based on this information. If the role permission satisfies the permission requirement, then the action request is accepted and the action is performed within the group-based communication system. If the role permission does not satisfy the permission requirement the action request is denied and the action is not performed. In some embodiments, upon denying the action request, a notification may be sent to the user to notify the user that the action was prevented because the user is not associated with an eligible role.

It should be understood that, in some embodiments the component responsibility may be altered from that shown in FIG. 4. For example, in some embodiments, the identity provider data store 166 may perform at least a portion of the actions discussed with respect to the role data store 170. Similarly, in some embodiments, at least a portion of the actions discussed with respect to the group-based communication system server 158 may be performed by the role server 168 or the identity provider server 164.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for role-based access management within a group-based communication system, the method comprising:
    determining that a first role is assigned to a first user, the first role associated with a first set of permissions,
    wherein the first role is assigned to the first user within an external application distinct from the group-based communication system;
    allowing the first user to access a first set of data shared within the group-based communication system based on the first set of permissions associated with the first role;
    determining that a second role is assigned to the first user, the second role associated with a second set of permissions,
    wherein the second role is distinct from the first role and the second set of permissions is distinct from the first set of permissions; and
    allowing the first user to perform at least one action within the group-based communication system based on the second set of permissions associated with the second role.

2. The method of claim 1, wherein the second role is assigned to the first user from within the group-based communication system.

3. The method of claim 1, wherein the first role is a default role and the first set of permissions are default permissions.

4. The method of claim 3, further comprising:
adding one or more permissions to the first set of permissions associated with the first role to thereby limit access to one or more notifications to a subset of users assigned to the first role.

5. The method of claim 1, further comprising:
responsive to determining that a second user does not have access to a resource associated with the group-based communication system, generating a notification comprising an indication that the second user does not have access to the resource.

6. The method of claim 1, wherein the at least one action comprises creating a group-based communication channel within the group-based communication system.

7. The method of claim 6, wherein the first user is an administrator user and the first role comprises an administrator role.

8. One or more non-transitory computer-readable media that store computer-readable instructions that, when executed by at least one processor, perform a method for role-based access management within a group-based communication system, the method comprising:
determining that a first role is assigned to a first user, the first role associated with a first set of permissions,
wherein the first role is assigned to the first user within an external application distinct from the group-based communication system;
allowing the first user to access a first set of data shared within the group-based communication system based on the first set of permissions associated with the first role; and
determining that a second role is assigned to the first user, the second role associated with a second set of permissions,
wherein the second role is distinct from the first role and the second set of permissions is distinct from the first set of permissions.

9. The one or more non-transitory computer-readable media of claim 8, wherein the method further comprises:
allowing the first user to perform at least one action within the group-based communication system based on the second set of permissions associated with the second role.

10. The one or more non-transitory computer-readable media of claim 9, wherein the first user is an administrator user and the first role comprises an administrator role.

11. The one or more non-transitory computer-readable media of claim 10, wherein the at least one action comprises creating a group-based communication channel within the group-based communication system.

12. The one or more non-transitory computer-readable media of claim 8, wherein the method further comprises:
responsive to determining that a second user does not have access to a resource associated with the group-based communication system, generating a notification comprising an indication that the second user does not have access to the resource.

13. The one or more non-transitory computer-readable media of claim 8, wherein the method further comprises:
determining that a second user does not have access to a resource associated with the group-based communication system based on role information.

14. The one or more non-transitory computer-readable media of claim 13, wherein the method further comprises:
responsive to determining that the second user does not have access to the resource, generating a notification comprising an indication that the second user does not have access to the resource.

15. A system comprising:
at least one processor; and
one or more non-transitory computer-readable media that store computer-readable instructions that, when executed by the at least one processor, perform a method for role-based access management within a group-based communication system, the method comprising:
determining that a first role is assigned to a first user, the first role associated with a first set of permissions;
allowing the first user to access a first set of data shared within the group-based communication system based on the first set of permissions associated with the first role;
determining that a second role is assigned to the first user, the second role associated with a second set of permissions,
wherein the second role is distinct from the first role and the second set of permissions is distinct from the first set of permissions; and
allowing the first user to perform at least one action within the group-based communication system based on the second set of permissions associated with the second role.

16. The system of claim 15, wherein the first role is assigned to the first user within an external application distinct from the group-based communication system, and wherein the first role comprises a security role and the first set of permissions comprises a permission to edit one or more security settings.

17. The system of claim 16, wherein the security role is a predefined default security role associated from the external application.

18. The system of claim 17, wherein the method further comprises:
receiving a request to adjust the permission to edit the one or more security settings of the security role; and
updating the permission to edit the one or more security settings based on the request.

19. The system of claim 15, wherein the method further comprises:
responsive to determining that a second user does not have access to a resource associated with the group-based communication system, generating a notification comprising an indication that the second user does not have access to the resource.

20. The system of claim 15, wherein the method further comprises:
receiving, from the first user, a request to access a resource;
responsive to receiving the request to access the resource, determining that the first user does not have access to the resource based on at least one of the first set of permissions and the second set of permissions; and
responsive to determining that the first user does not have access to the resource, generating a permission error notification for the first user.

* * * * *